Figure 1:
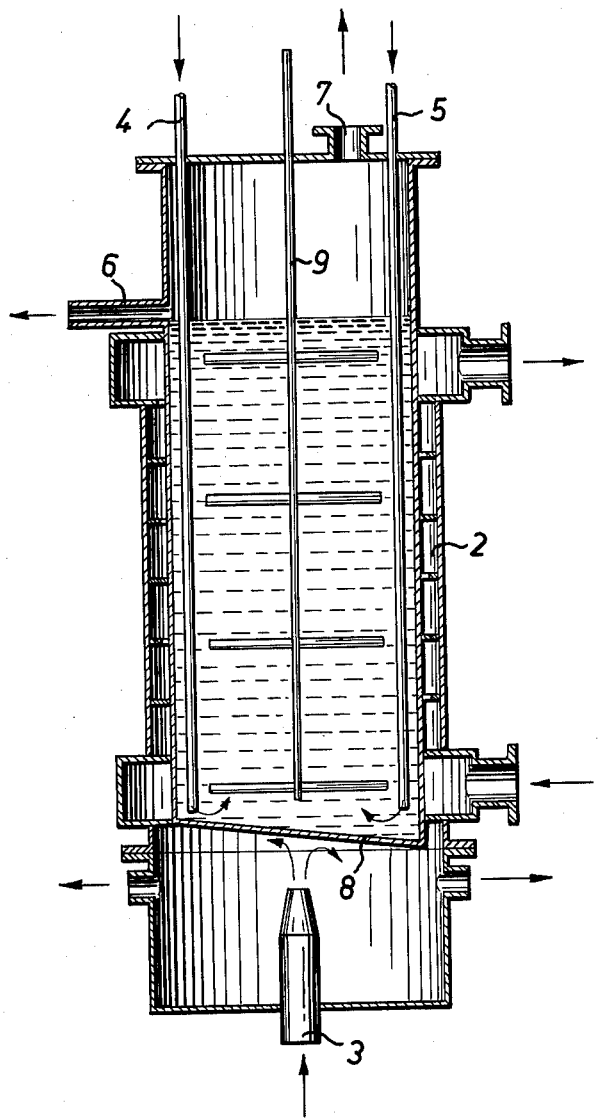

[19] United States Patent
Niermann et al.

[11] 4,097,583
[45] Jun. 27, 1978

[54] PROCESS FOR THE PRODUCTION OF PHOSPHORUS PENTASULFIDE

[75] Inventors: Hermann Niermann, Erftstadt Bliesheim; Franz Mainzer, Hurth, both of Germany

[73] Assignee: Hoechst Aktiengesellschaft, Frankfurt am Main, Germany

[21] Appl. No.: 777,451

[22] Filed: Mar. 14, 1977

Related U.S. Application Data

[63] Continuation of Ser. No. 657,548, Feb. 12, 1976, abandoned, which is a continuation of Ser. No. 480,353, Jun. 18, 1974, abandoned.

[30] Foreign Application Priority Data

Sep. 19, 1973 Germany .............................. 2347062

[51] Int. Cl.² ........................................... C01B 25/14
[52] U.S. Cl. ...................................... 423/303; 23/285
[58] Field of Search .......................... 423/303; 23/285

[56] References Cited

U.S. PATENT DOCUMENTS

| 2,794,705 | 6/1957 | Hudson | 423/303 |
| 3,183,062 | 5/1965 | Taylor | 423/303 |
| 3,215,506 | 11/1965 | Keil et al. | 23/285 |
| 3,524,725 | 8/1970 | Cremier et al. | 423/303 |

Primary Examiner—Earl C. Thomas
Assistant Examiner—Gregory A. Heller
Attorney, Agent, or Firm—Connolly and Hutz

[57] ABSTRACT

Production of phosphorus pentasulfide from phosphorus and sulfur at elevated temperature in a reactor of which the walls are in heat exchange with a substance kept at the temperature necessary for cooling or heating reaction mixture.

The heat exchange in the bottom portion of the reactor is more particularly effected with the use of a system functioning separately and independently from the heat exchange system surrounding the lateral walls of the reactor.

3 Claims, 2 Drawing Figures

U.S. Patent  June 27, 1978  4,097,583

PROCESS FOR THE PRODUCTION OF PHOSPHORUS PENTASULFIDE

This application is a continuation of copending application Ser. No. 657,548, filed Feb. 12, 1976, now abandoned which in turn is a continuation of the parent application Ser. No. 480,353, filed June 18, 1974 by the same inventors, now abandoned.

The present invention relates to a process for making phosphorus pentasulfide from phosphorus and sulfur at elevated temperature in a reaction zone whose walls, receiving and controlling the reaction heat, are in heat exchange with a substance, which is kept at the temperature necessary for cooling or heating the reaction mixture.

It is known that $P_2S_5$ can be produced by reacting molten phosphorus and sulfur at temperatures within the range about 280° and 515° C. The abstraction of heat set free during that reaction, which is necessary to keep the reaction temperature within the range specified, has already been tried in various ways.

As described in U.S. Pat. No. 2,794,705, attempts have been made to introduce phosphorus and sulfur into a melt of $P_2S_5$ and to use the reaction heat for the distillation of resulting new product. This, however, is not fully satisfactory as it is necessary for the $P_2S_5$ to be distilled with heavy expenditure and difficulties, which reside in the fact that molten $P_2S_5$ or $P_2S_5$ in vapor form is readily ignitable.

A further process has been described in U.S. Pat. No. 2,569,128, wherein phosphorus and sulfur are reacted in a reactor provided with a cooling system opening into the lateral walls thereof. The cooling medium is a liquid, preferably inert heat exchanging substance. At the high reaction temperatues, liquid cooling media have, however, a more or less pronounced tendency to decompose whereby the heat exchanger surfaces become encrusted. In addition to this, cooling media heated to high temperatures are not easy to control.

To avoid this undesirable phenomenon, it has been suggested in German Pat. No. 1,165,560 that the lateral walls of the reactor be cooled by means of a gas stream-flowing along the walls. While this process compares very favorably with those which are customarily used for making $P_2S_5$, the fact remains that it also is not fully satisfactory. In the bottom zone of the reactor, which is not cooled, the product is subject to overheating and delayed boiling whereby the reaction is considerably affected as are reactor elements and the frame supporting the reactor.

In addition to this, the product is rendered inhomogeneous and qualitatively impaired by the temperature differences which occur in the reactor.

The present invention now unexpectedly provides a process which is free from the disadvantageous phenomena reported above and wherein the heat exchanging substance is delivered to the bottom portion of the reaction zone through a system functioning separately and independently from the heat exchanging system surrounding the lateral walls of the reaction zone.

Depending on the quantity of material desired to be put through the reaction zone, it is possible for the two independent heat exchanging systems to be operated in various ways. In those cases in which a relatively low throughput of material is desirable, it is good practice to cool the bottom portion of the reaction zone by means of air as the heat exchanging substance, and to heat the lateral walls of the reactor, for example with the use of or one or more hot combustion gases, as the heat exchanging substance. In those cases, however, in which standard quantities are put through, it is advantageous for both the bottom portion and the lateral walls of the reaction zone to be cooled with air. In those cases in which the throughput of large quantities of material is desirable, it is advantageous for the bottom portion of the reaction zone to be cooled with water, and for the lateral walls to be cooled with air.

The present invention has been found to offer a series of beneficial effects.

The reaction is stabilized and the temperatures prevailing in the reactor are rendered more uniform. The reactor's capacity can be considerably increased and a qualitatively improved final product is obtained. The final product has more particularly an improved homogeneity and contains less iron contaminants.

$P_2S_5$ produced as described in German Pat. No. 1,165,560 contains at least between 5 and 8 ppm (parts per million) of Fe-contaminants, whereas $P_2S_5$ produced in accordance with the present invention contains as little as 1-2 ppm of Fe.

An exemplary form of apparatus for carrying out the process of the present invention is shown diagrammatically in the accompanying drawing.

As can be seen, the apparatus comprises a reactor provided with inlets 4 and 5 for the supply of phosphorus and sulfur thereinto, with an outlet 6 for the removal of final product and with an off-gas outlet 7; a jacket 2 provided with a cooling system surrounding the lateral walls of reactor 1, and a further cooling system 3 placed below the bottom portion 8 of reactor 1. The bottom portion 8 of reactor 1 should preferably be plane and inclined with respect to the horizontal. The phosphorus and sulfur supply inlets should preferably open into the reactor 1 down to its bottom portion 8, and the outlet 6 should preferably form an overflow.

Figure 2:
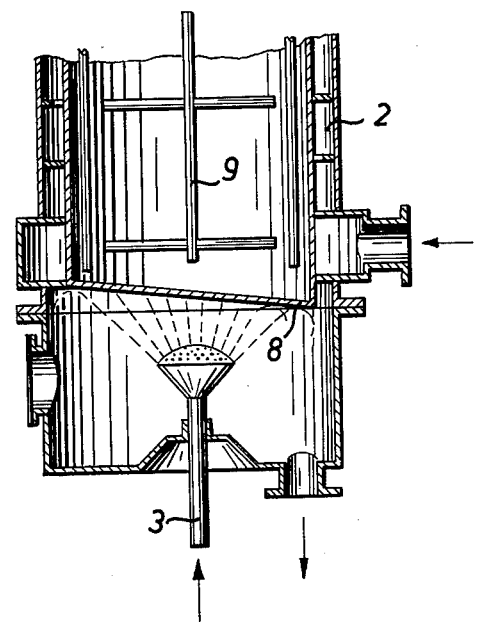

The cooling system 3 cooling the bottom 8 may be a nozzle system adapted to spray a cooling medium therethrough (FIG. 2) or a gas nozzle (FIG. 1). It is also possible for the reactor 1 to have an agitator 9 mounted therein.

EXAMPLE 1

620 kg of $P_2S_5$ was produced per hour with agitation in a reactor having a capacity of 400 l, of which the helical cooling jacket was cooled with air as described in German Pat. No. 1,165,560. The temperature was within the range 390° and 400° C near the bottom, and within the range 365° and 375° C near the head of the reactor. The final product contained 28.1% of P, 71.9% of S and 7 ppm of Fe-contaminants.

EXAMPLE 2

The reactor was the same as that used in Example 1 save that its cooling jacket and bottom portion were cooled separately and independently with air. This enabled 735 kg of $P_2S_5$ to be produced per hour with agitation.

The temperature was within the range 375° and 390° C near the bottom, and within the range 370° and 375° C near the head of the reactor. The final product contained 28.1% of P, 71.9% of S and 1 ppm of Fe-contaminant.

We claim:
1. In the process for the manufacture of phosphorus sulfides by reacting phosphorus with sulfur at elevated temperatures in a reaction zone surrounded by a heat exchanging material which receives and controls the reaction heat, which comprises maintaining in the reaction zone by heating and cooling, respectively, a temperature below the boiling and above the solidification point of the reaction mixture by causing a gas stream having the temperature necessary for heating and cooling, respectively, to flow around the reaction zone, conducting the gas stream so as to permit reversing the reaction zone substantially instantaneously from heating to cooling and vice versa, the gas stream for cooling being suction drawn past the reaction zone to create a sub-pressure with respect to the interior of the reaction zone for preventing the gas from penetrating the reaction zone whereby any liquid phosphorus sulfide escaping from the reaction zone is immediately solidified in the presence of the gas stream flowing around the reaction zone at a high velocity of flow, and the gas stream for heating comprising combustion and off-gases, being free from oxygen and originating from a mixture of a combustible and air, the improvement wherein the heat exchange in the bottom portion of the reactor is effected by means of a system actuated and operated separately and independently from the heat exchange system surrounding the lateral walls of the reactor whereby the resulting formation of a final product is obtained which is homogeneous and contains as little as one to two ppm. of iron in comparison to much more ppm. of iron contaminent are obtained by the same reaction in a reactor which is the same as previously described, except that the heat exchange in the bottom portion is not effected by means of a heat exchange system which is actuated and operated separately and independently from the heat exchange system surrounding the lateral walls of the reactor; and whereby:

(a) the lateral walls of the reactor are heated by means of hot combustion gas for performing the reaction at low throughput conditions;

(b) both the bottom portion and the lateral walls of the reactor are cooled with air for performing the reaction at standard throughput conditions; and (c) the bottom portion of the reactor is cooled with water and the lateral walls of the reactor are cooled with air for performing the reaction at high throughput conditions.

2. A process as set forth in claim 1, wherein the standard throughput conditions produce about 735 kg of $P_2S_5$ per hour with agitation in a reactor of about 400 l. capacity.

3. A process as set forth in claim 2, wherein the temperature in the reactor is approximately in the range from 375° to 390° C near the bottom of the reactor and approximately in the range of 370° to 375° C near the head of the reactor, and wherein the final product contains about 1 ppm. of iron content.

* * * * *